United States Patent
Singh et al.

(10) Patent No.: US 12,528,348 B2
(45) Date of Patent: Jan. 20, 2026

(54) AIRFLOW REGULATION ASSEMBLIES FOR VEHICLES INCLUDING AN ACTIVE GRILLE SHUTTER CONNECTED TO A REINFORCEMENT MEMBER

(71) Applicant: Nissan North America, Inc., Franklin, TN (US)

(72) Inventors: Jasvir Singh, Novi, MI (US); Spencer Boyd, III, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 309 days.

(21) Appl. No.: 17/885,087

(22) Filed: Aug. 10, 2022

(65) Prior Publication Data
US 2024/0051382 A1    Feb. 15, 2024

(51) Int. Cl.
*B60K 11/08* (2006.01)

(52) U.S. Cl.
CPC .................................. *B60K 11/085* (2013.01)

(58) Field of Classification Search
CPC .................................................... B60K 11/085
See application file for complete search history.

(56) References Cited

U.S. PATENT DOCUMENTS

| | | | | |
|---|---|---|---|---|
| 5,271,473 A * | 12/1993 | Ikeda | ..................... | B60K 11/04 296/203.02 |
| 8,646,554 B2 * | 2/2014 | Takahashi | ............ | B62D 25/084 165/67 |
| 8,919,864 B2 * | 12/2014 | Kojima | ................ | B60K 11/085 296/180.5 |
| 9,085,233 B2 * | 7/2015 | Oota | ..................... | B60K 11/085 |
| 2004/0084236 A1 * | 5/2004 | Okai | ...................... | B62D 25/08 296/187.09 |
| 2004/0104599 A1 * | 6/2004 | Svendsen | ............. | B62D 33/077 296/187.09 |
| 2007/0251488 A1 * | 11/2007 | Fujima | ................... | H01H 50/04 123/195 P |
| 2008/0100073 A1 * | 5/2008 | Mitsuyama | .......... | B62D 25/163 293/132 |
| 2014/0084624 A1 * | 3/2014 | Kojima | ................ | B60K 11/085 296/180.1 |
| 2014/0090911 A1 * | 4/2014 | Oota | ..................... | B60K 11/085 180/68.1 |
| 2018/0154764 A1 * | 6/2018 | Uchida | ................... | B60R 19/48 |
| 2019/0195475 A1 * | 6/2019 | Jones | .................... | F21V 21/041 |

FOREIGN PATENT DOCUMENTS

EP              3272565 A1 *   1/2018   .......... B60K 11/085

* cited by examiner

*Primary Examiner* — Kurt Philip Liethen
(74) *Attorney, Agent, or Firm* — Young Basile Hanlon & MacFarlane, P.C.

(57) ABSTRACT

A vehicle includes: a vehicle body; a support structure that is connected to the vehicle body and which is configured to provide a framework for one or more thermal components of the vehicle; a reinforcement member that is connected to the vehicle body and which is configured to absorb impact forces; and an airflow regulation assembly that includes an active grille shutter. The active grille shutter is mechanically connected to the reinforcement member such that the reinforcement member directly supports the active grille shutter in an elevated position (e.g., vertically above the reinforcement member).

20 Claims, 8 Drawing Sheets

AIRFLOW REGULATION ASSEMBLIES FOR VEHICLES INCLUDING AN ACTIVE GRILLE SHUTTER CONNECTED TO A REINFORCEMENT MEMBER

TECHNICAL FIELD

The present disclosure relates to an airflow regulation assembly for a vehicle including an active grille shutter. More specifically, the present disclosure describes an airflow regulation assembly in which the active grille shutter is connected to (supported by) a front-end reinforcement member (crash beam) in the vehicle.

BACKGROUND

Many vehicles include an airflow regulation assembly with an active grille shutter to improve fuel economy by providing a mechanism for controlling the volume of air flowing into the radiator (and/or other areas of the engine compartment) according to the particular airflow requirements of the vehicle during various driving conditions. Operation of the airflow regulation assembly (e.g., the active grille shutter) is dictated by a number of factors including, for example, engine cooling and thermal specifications, which also influence (e.g., determine) the size of the shutters and the sequence at which they open and close.

Typically, an active grille shutter is located behind the radiator grille and is connected to the radiator core support structure, which supports the thermal components of the vehicle (e.g., the radiator, the condenser, etc.). As such, an opportunity exists to improve packaging in the front-end of the vehicle by reducing the overall number of components and, thus, the complexity associated with assembly, repair, maintenance, etc. The present disclosure addresses this opportunity by providing an airflow regulation assembly in which the active grille shutter is connected to the front-end reinforcement member.

SUMMARY

In one aspect of the present disclosure, a vehicle is disclosed that includes: a vehicle body; a support structure that is connected to the vehicle body and which is configured to provide a framework for one or more thermal components of the vehicle; a reinforcement member that is connected to the vehicle body and which is configured to absorb impact forces; an active grille shutter that is connected to the reinforcement member such that the reinforcement member directly supports the active grille shutter; a mounting bracket that is positioned between the active grille shutter and the reinforcement member; and at least one fastener that extends into the reinforcement member through the active grille shutter and the mounting bracket to thereby mechanically connect the active grille shutter to the reinforcement member via the mounting bracket. The active grille shutter includes: a main body; at least one shutter that is movably connected to the main body; and an actuator that is connected to the at least one shutter such that the at least one shutter is repositionable between open and closed positions to thereby vary airflow into the vehicle.

In certain embodiments, the main body may include a frame that is configured to support the at least one shutter and the actuator and braces that extend laterally outward from the frame.

In certain embodiments, the braces may be configured for connection to the support structure.

In certain embodiments, the frame may define a chamber that is configured to receive the actuator.

In certain embodiments, the braces may each include a first arm that extends in generally parallel relation to the frame and a second arm that extends in transverse relation to the first arm.

In certain embodiments, the mounting bracket may include a generally Z-shaped cross-sectional configuration.

In certain embodiments, the mounting bracket may include: a first leg that is positioned between the active grille shutter and the reinforcement member; a second leg that extends from the first leg in generally orthogonal relation thereto; and a third leg that extends from the second leg in generally orthogonal relation thereto.

In certain embodiments, the first leg and the second leg may be configured for engagement with the reinforcement member.

In certain embodiments, the first leg and the third leg may extend in generally parallel relation.

In certain embodiments, the first leg may include an alignment member that is configured for engagement with the reinforcement member to facilitate proper relative orientation of the active grille shutter, the mounting bracket, and the reinforcement member.

In certain embodiments, the vehicle may further include a grommet that is positioned between the active grille shutter and the mounting bracket to inhibit relative movement therebetween.

In certain embodiments, the grommet may extend through the third leg of the mounting bracket such that the grommet is spaced axially from the reinforcement member along the length of the vehicle.

In another aspect of the present disclosure, a vehicle is disclosed that includes: a vehicle body; a support structure that is connected to the vehicle body and which is configured to provide a framework for one or more thermal components of the vehicle; a reinforcement member that is connected to the vehicle body and which is configured to absorb impact forces; and an airflow regulation assembly including an active grille shutter that is mechanically connected to the reinforcement member such that the reinforcement member directly supports the active grille shutter in an elevated position vertically above the reinforcement member.

In certain embodiments, the active grille shutter may be mechanically connected to an upper vertical end of the reinforcement member.

In certain embodiments, the active grille shutter may be indirectly connected to the reinforcement member.

In certain embodiments, the airflow regulation assembly may further include a mounting bracket that is positioned between the active grille shutter and the reinforcement member.

In certain embodiments, the airflow regulation assembly may further include a dampener that is positioned between the active grille shutter and the mounting bracket.

In another aspect of the present disclosure, a vehicle is disclosed that includes: a vehicle body; a support structure that is connected to the vehicle body and which is configured to provide a framework for one or more thermal components of the vehicle; a reinforcement member that is connected to the vehicle body and which is configured to absorb impact forces; and an airflow regulation assembly that is mechanically connected to the reinforcement member and which includes an active grille shutter. The active grille shutter includes: an upper end and a lower end; a mounting member that extends from the lower end; and a mounting bracket that is connected to the mounting member such that the mounting bracket is positioned between the mounting member and the reinforcement member.

In certain embodiments, the mounting member may include a generally L-shaped cross-sectional configuration.

In certain embodiments, the mounting bracket may include a generally Z-shaped cross-sectional configuration.

In certain embodiments, the mounting member may include a first segment that extends axially from the lower end of the active grille shutter along the length of the vehicle and a second segment that extends from the first segment in generally orthogonal relation thereto.

In certain embodiments, the mounting bracket may include: a first leg; a second leg; and a third leg.

In certain embodiments, the first leg may extend in generally parallel relation to the first segment.

In certain embodiments, the second leg may extend from the first leg in generally orthogonal relation thereto.

In certain embodiments, the third leg may extend from the second leg in generally orthogonal relation thereto and in generally parallel relation to the second segment.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes a vehicle that includes: a vehicle body; a support structure that is connected to the vehicle body and which is configured to provide a framework for one or more thermal components of the vehicle (e.g., the radiator, the condenser, etc.); a (front-end) reinforcement member (e.g., a crash beam) that is connected to the vehicle body and which is configured to absorb impact forces; and an airflow regulation assembly that controls (regulates) airflow into the vehicle according to the particular airflow requirements of the vehicle during various driving conditions. The airflow regulation assembly includes an active grille shutter that is mechanically connected to the reinforcement member such that the reinforcement member supports the active grille shutter in an elevated position (e.g., such that the active grille shutter is positioned vertically above the reinforcement member).

In certain embodiments, the airflow regulation assembly further includes at least one mounting bracket that is configured to operatively (indirectly) connect the active grille shutter to the reinforcement member. In order to facilitate force absorption, reduce rattle, and improve stability, the airflow regulation assembly may also include at least one dampener that is positioned between the active grille shutter and the mounting bracket(s). Additionally, or alternatively, the airflow regulation assembly may include at least one grommet that is positioned between the active grille shutter and the mounting bracket(s). The grommet(s) are configured to not only stabilize the active grille shutter by inhibiting relative movement between the active grille shutter and the mounting bracket(s), but facilitate proper alignment of the active grille shutter and the mounting bracket(s).

Figure 1:
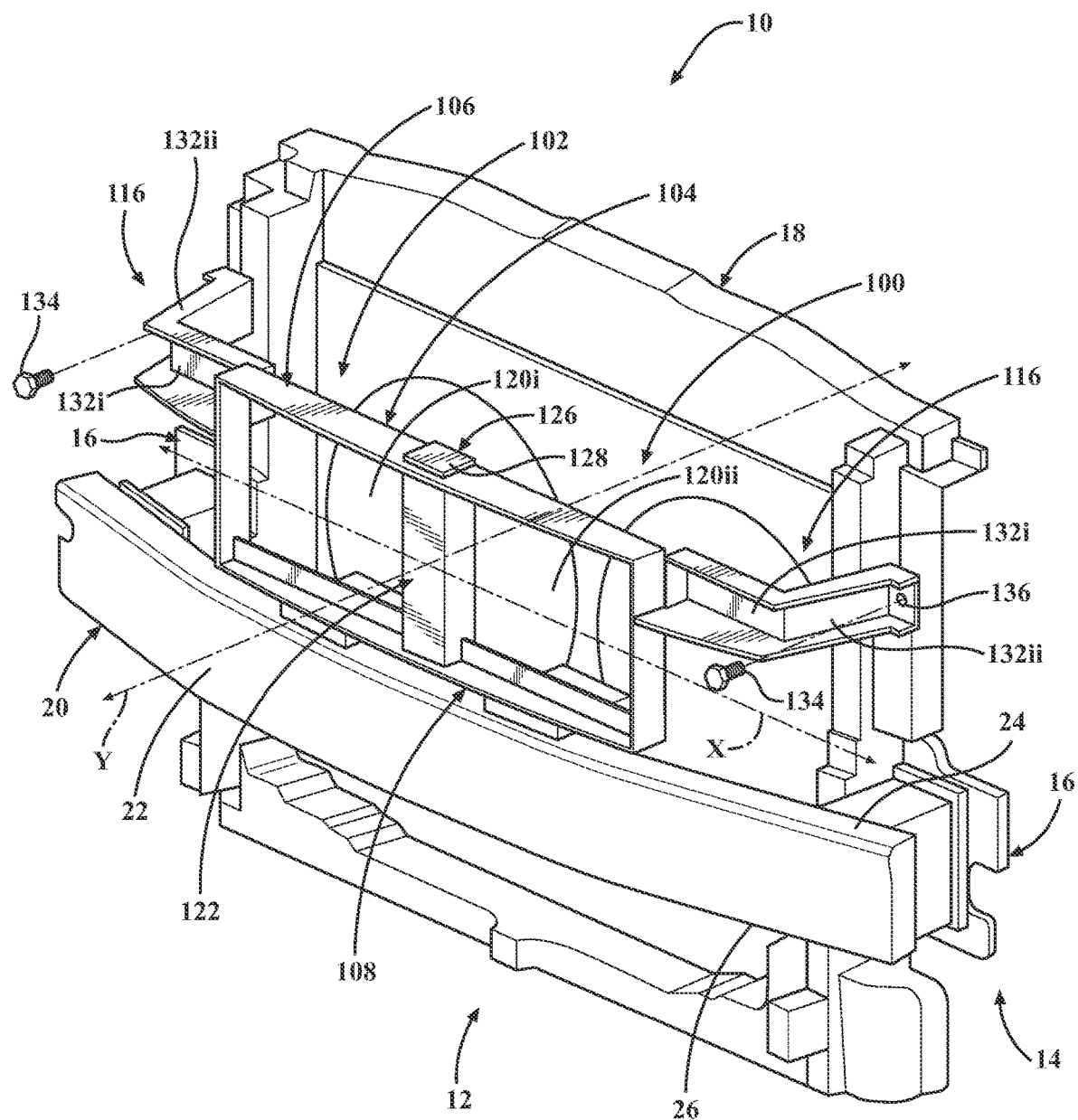
FIG. 1 is a partial, front, perspective view of an airflow regulation assembly including an active grille shutter according to the principles of the present disclosure shown installed in the front-end of a vehicle.

With reference to FIG. 1, a vehicle 10 is illustrated with a front-end 12 that includes: a vehicle body (chassis) 14 with lateral supports 16; a (radiator core) support structure 18; a (front-end) reinforcement member 20 (e.g., a crash beam 22); and an airflow regulation assembly 100. Although generally illustrated and described in the context of a passenger vehicle, it should be appreciated that the principles of the present disclosure are equally applicable to a variety of vehicles (e.g., trucks, SUVs, vans, buses, etc.).

The support structure 18 is a structural component of the vehicle 10 that not only adds rigidity and strength, but supports and provides a framework for one or more of the thermal components of the vehicle 10 (e.g., the radiator, the condenser, etc.). The support structure 18 is connected to the vehicle body 14 (e.g., the lateral supports 16) and is positioned axially inward of (e.g., is spaced rearwardly from) the reinforcement member 20 and the front fascia (not shown) along a longitudinal (first) axis Y (which extends in (generally) parallel relation to the length of the vehicle 10). It is envisioned that the support structure 18 may be removably or fixedly (e.g., non-removably) connected to the vehicle body 14 in any suitable manner, including, for example, via at least one mechanical fastener (e.g., one or more bolts, screws, rivets, pins, clips, or the like), via welding, via integral (e.g., unitary, monolithic) formation therewith, etc.

The reinforcement member 20 protects and fortifies the front-end 12 of the vehicle 10 and is positioned axially between the front fascia (not shown) and the support structure 18 along the longitudinal axis Y. The reinforcement member 20 is connected to (supported by) the vehicle body 14 (e.g., the lateral supports 16) and acts as a bumper that absorbs force during an impact with the vehicle 10 (e.g., a crash, a collision, etc.). It is envisioned that the reinforcement member 20 may be removably or fixedly (e.g., non-removably) connected to the vehicle body 14 in any suitable manner, including, for example, via at least one mechanical fastener (e.g., one or more bolts, screws, rivets, pins, clips, or the like), via welding, via integral (e.g., unitary, monolithic) formation therewith, etc.

With reference now to FIGS. 2A-7 as well, the airflow regulation assembly 100 will be discussed. The airflow regulation assembly 100 is secured (connected to) the reinforcement member 20 and includes an active grille shutter 102. As described in detail below, the active grille shutter 102 controls (regulates) airflow into the vehicle 10 and includes: a main body 104 having respective upper and lower ends 106, 108; at least one shutter 110 that is movably connected to the main body 104 (the shutter(s) 110 are shown partially removed in FIG. 1 to improve clarity); and an actuator 112 that is connected to the main body 104 and the shutter(s) 110 such that the shutter(s) 110 are repositionable between open and closed positions to thereby vary airflow into the vehicle 10 based upon the particular airflow requirements during various driving conditions.

The main body 104 includes: a frame 114; at least one brace 116; and at least one mounting members 118. The main body 104 provides a housing for the shutter(s) 110 and the actuator 112 and is connected to the reinforcement member 20 (FIG. 1) such that the reinforcement member 20 directly supports the active grille shutter 102, as described in further detail below. In the particular embodiment illustrated, the active grille shutter 102 is (mechanically) connected to an upper vertical end 24 of the reinforcement member 20, whereby the reinforcement member 20 supports the active grille shutter 102 in an elevated position (e.g., such that the active grille shutter 102 is positioned vertically above the reinforcement member 20). Depending upon the particular style of the vehicle 10, the configuration of the support structure 18, the configuration of the reinforcement member 20, etc., however, the present disclosure also envisions embodiments in which the active grille shutter 102 may be connected to (supported by) a lower vertical end 26 of the reinforcement member 20 (e.g., such that the active grille shutter 102 is positioned vertically below the reinforcement member 20).

The frame 114 includes a (generally) rectangular configuration and supports the shutter(s) 110 and the actuator 112 such that the shutter(s) 110 are repositionable between the open and closed positions. In the particular embodiment illustrated, the active grille shutter 102 includes a (first) shutter 110$i$, which is shown in the open position in FIG. 2A, and a (second) shutter 110$ii$, which is shown in the closed position in FIG. 2A. As such, the frame 114 defines a (first) window 120$i$ (FIG. 1) that receives the shutter 110$i$ and a (second) window 120$ii$ that receives the shutter 110$ii$. It should be appreciated, however, that the particular number of shutters 110 and, thus, the particular number of window 120 defined by the frame 114, may be altered in various embodiments without departing from the scope of the present disclosure (e.g., depending upon the airflow requirements of the vehicle 10). As such, embodiments of the airflow regulation assembly 100 including both greater and fewer numbers of shutters 110 and windows 120 are contemplated herein and would not be beyond the scope of the present disclosure.

Figure 3:
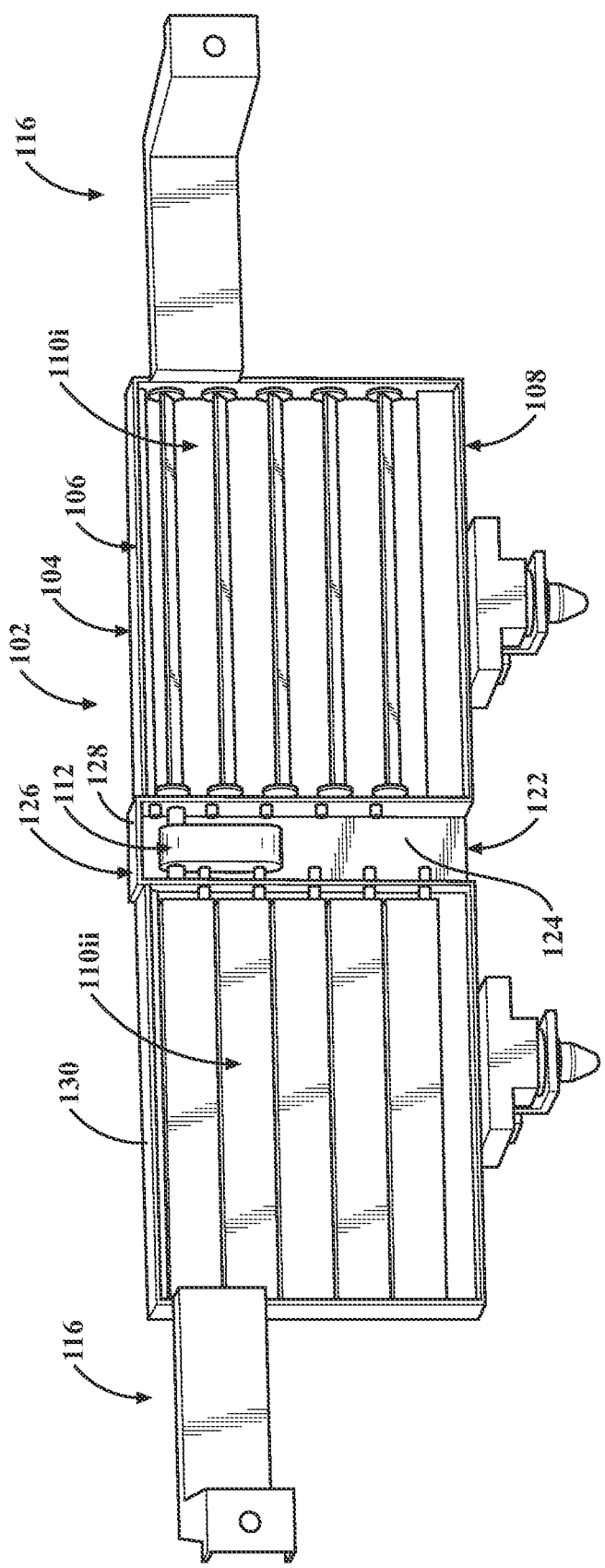
FIG. 3 is a rear, perspective view of the airflow regulation assembly seen in FIG. 1.
Figure 4:
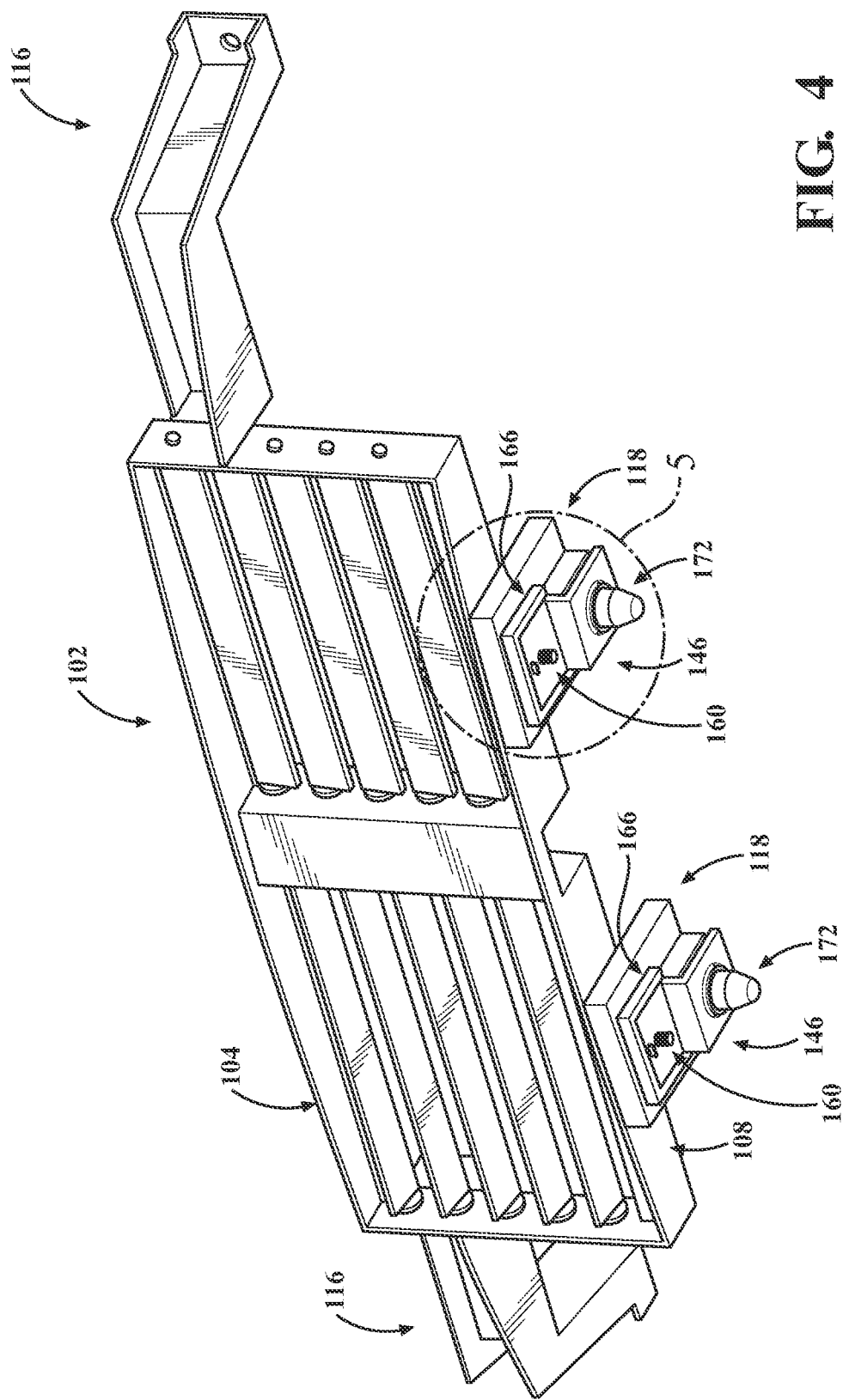
FIG. 4 is a bottom, perspective view of the airflow regulation assembly seen in FIG. 1.

The windows 120$i$, 120$ii$ are separated (delineated) by an actuator support 122, which extends vertically between the windows 120$i$, 120$ii$. As seen in FIG. 3, the actuator support 122 defines a chamber 124 that is configured to receive (accommodate, conceal) the actuator 112. In certain embodiments of the disclosure, such as that illustrated, it is envisioned that the frame 114 may include (define) an extension 126 that is located at the upper end 106 of the main body 104 in (general) alignment with the actuator support 122. The extension 126 is configured to create additional clearance for the actuator 112 (e.g., depending upon the configuration of the actuator 112, spatial requirements, manufacturing tolerances, etc.) and defines an upper wall 128 that extends (vertically) beyond an uppermost surface 130 of the frame 114, whereby the uppermost surface 130 of the frame 114 includes a discontinuous (irregular, non-linear) configuration. Embodiments of the frame 114 that are devoid of the extension 126 (e.g., embodiments in which the uppermost surface 130 of the frame 114 includes a continuous (linear) configuration) are also envisioned herein, however, and would not be beyond the scope of the present disclosure.

The braces 116 extend laterally outward from the frame 114 along a lateral (transverse, second) axis X (which extends in (generally) parallel relation to a width of the vehicle 10 and in (generally) orthogonal relation to the longitudinal axis Y) and provide additional stability to the airflow regulation assembly 100 (e.g., the active grille shutter 102).

While the airflow regulation assembly 100 (e.g., the active grille shutter 102) is shown as including two braces 116 in the particular embodiment illustrated, it should be appreciated that the particular number of braces 116 may be altered in various embodiments without departing from the scope of the present disclosure (e.g., depending upon the style of the vehicle 10, the configuration of the active grille shutter 102, the configuration of the reinforcement member 20, spatial requirements, etc.). As such, embodiments of the airflow regulation assembly 100 including both greater and fewer numbers of braces 116 are contemplated herein and would not be beyond the scope of the present disclosure.

Each of the braces 116 includes a (first) arm 132$i$ (FIG. 2A) that extends in (generally) parallel relation to a (lateral) width W of the frame 114 and the lateral axis X and a (second) arm 132$ii$ that extends in transverse (e.g., non-parallel) relation to the frame 114, the lateral axis X, and the arm 132$i$, which facilitates connection of the braces 116 to the support structure 18 (FIG. 1). More specifically, the braces 116 are connected to the support structure 18 via at least one mechanical fastener 134 (e.g., one or more bolts, screws, rivets, pins, clips, etc.) that are configured for insertion through apertures 136 in the arms 132$ii$. It should be appreciated, however, that the braces 116 and the support structure 18 may by connected in any suitable manner including, for example, via at least one weld.

Figure 2A:
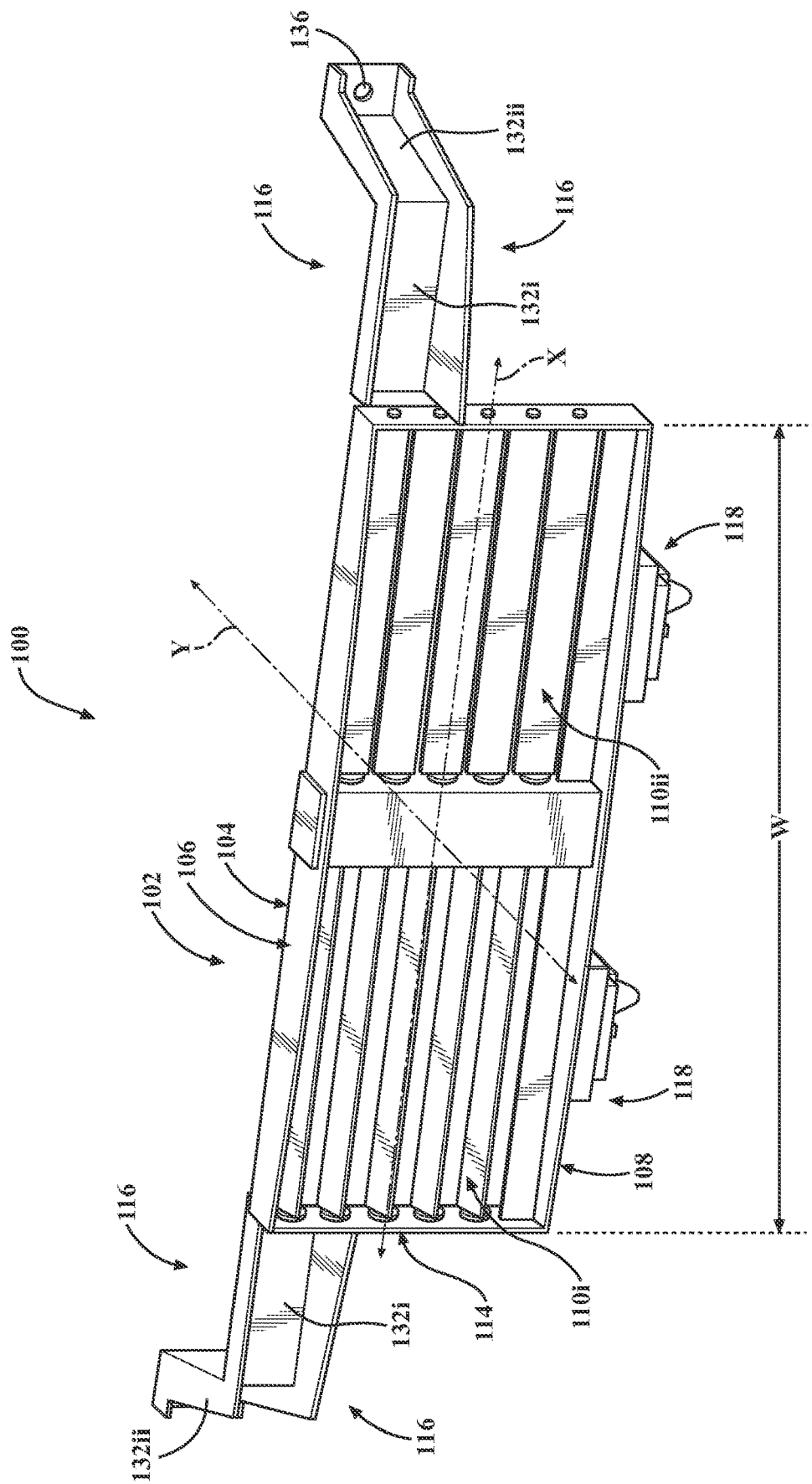
FIG. 2A is a front, perspective view of the airflow regulation assembly seen in FIG. 1.
Figure 2B:
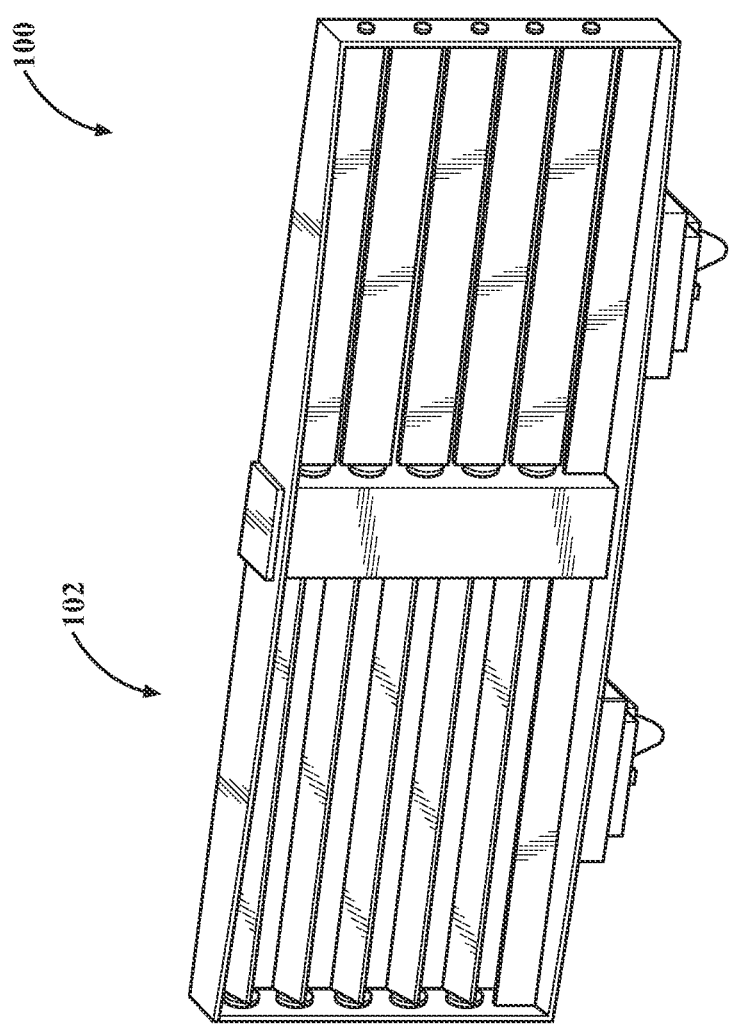
FIG. 2B is a front, perspective view of an alternate embodiment of the airflow regulation assembly seen in FIG. 1.

Depending upon the style of the vehicle 10, the configuration of the active grille shutter 102, the configuration of the reinforcement member 20, spatial requirements, manufacturing tolerances, etc., the present disclosure also contemplates that the active grille shutter 102 and the support structure 18 may be devoid of any direct connection therebetween and that the braces 116 may be configured for connection to any other suitable structures, components, or surfaces in the vehicle 10 including, for example, the vehicle body 14 (e.g., the lateral supports 16). As seen in FIG. 2B, the present disclosure also envisions embodiments of the airflow regulation assembly 100 in which the braces 116 may be eliminated from the active grille shutter 102 altogether.

The mounting member(s) 118 extend from the lower end 108 of the main body 104 and facilitate connection of the active grille shutter 102 to the reinforcement member 20. While the airflow regulation assembly 100 (e.g., the active grille shutter 102) is shown as including two mounting members 118 in the particular embodiment illustrated, it should be appreciated that the particular number of mounting members 118 may be altered in various embodiments without departing from the scope of the present disclosure (e.g., depending upon the style of the vehicle 10, the configuration of the active grille shutter 102, the configuration of the reinforcement member 20, spatial requirements, etc.). As such, embodiments of the airflow regulation assembly 100 including both greater and fewer numbers of mounting members 118 are contemplated herein and would not be beyond the scope of the present disclosure.

In the particular embodiment illustrated, the mounting members 118 are formed integrally (e.g., unitarily, monolithically) with the frame 114. Embodiments are also envisioned, however, in which the frame 114 and the mounting members 118 may be formed as separate, discrete structures that may be removably or fixedly (e.g., non-removably) connected together in any suitable manner, including, for example, via at least one mechanical fastener (e.g., one or more bolts, screws, rivets, pins, clips, etc.), via welding, or the like.

The mounting members 118 each include a generally L-shaped (vertical) cross-sectional configuration that is defined by a (first) segment 138*i* and a (second) segment 138*ii*. While the segments 138*i*, 138*ii* are shown as being integrally (e.g., unitarily, monolithically) formed in the particular embodiment illustrated, embodiments are also envisioned in which the segments 138*i*, 138*ii* may be formed as separate, discrete structures that may be removably or fixedly (e.g., non-removably) connected together in any suitable manner, including, for example, via at least one mechanical fastener (e.g., one or more bolts, screws, rivets, pins, clips, etc.), via welding, or the like.

Figure 6:
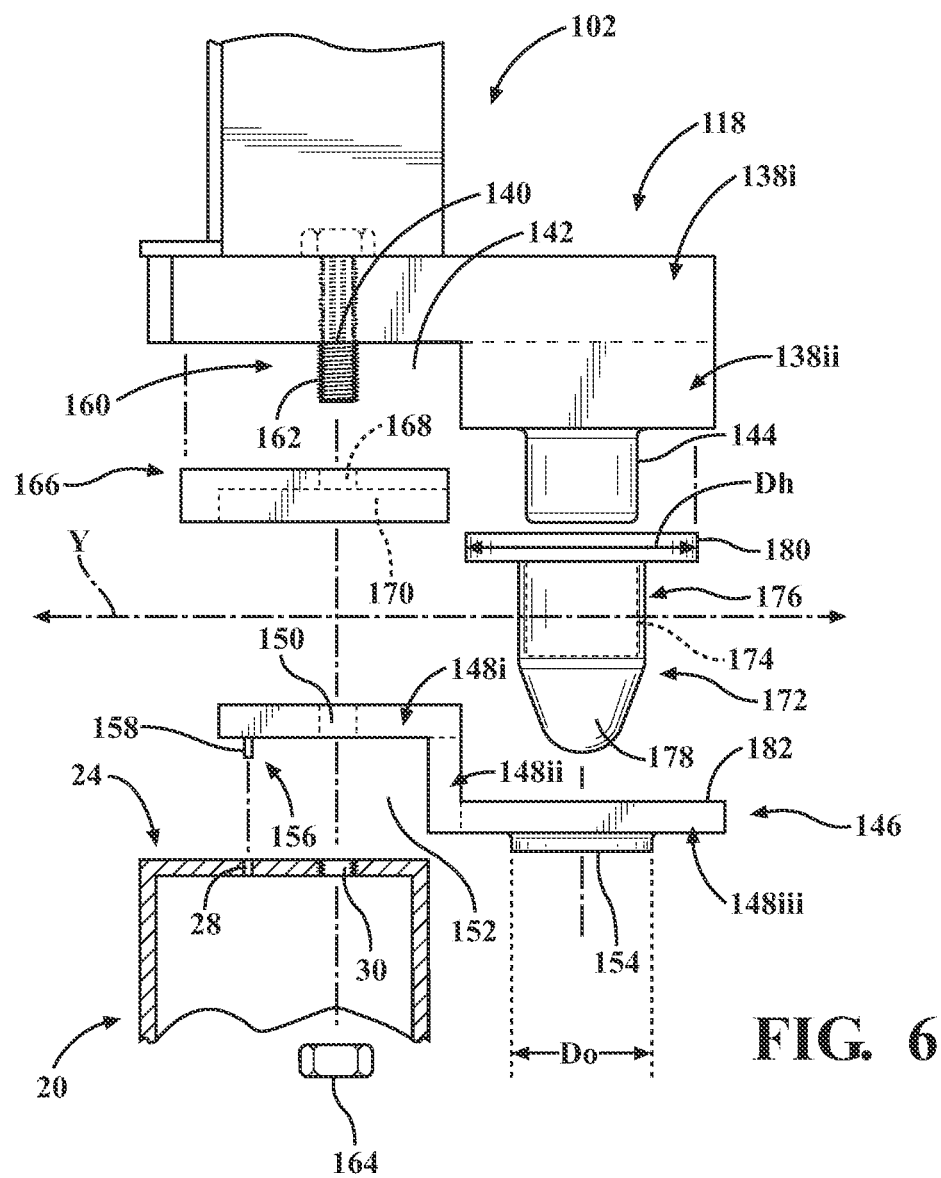
FIG. 6 is a partial, side, plan view of the airflow regulation assembly shown with parts separated during connection to a reinforcement member in the front-end of the vehicle.
Figure 7:
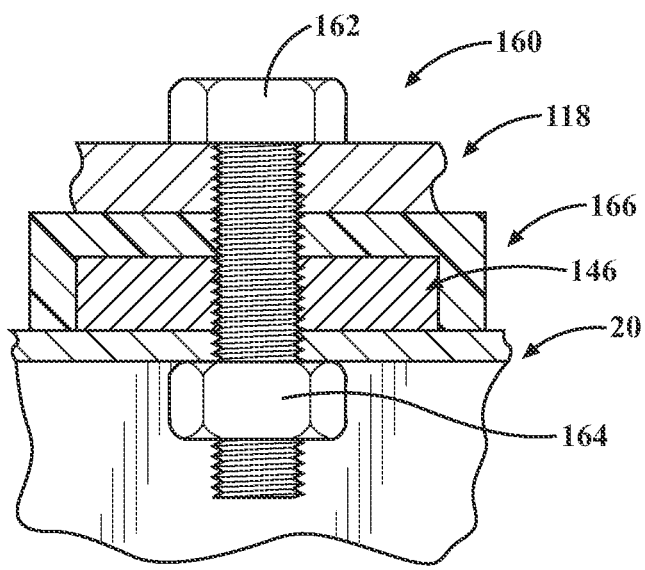
FIG. 7 is a partial, vertical cross-sectional view of the airflow regulation assembly and the reinforcement member upon connection.

The segment 138*i* includes (defines) and aperture 140 and extends axially from the lower end 108 of the main body 104 (e.g., in (generally) parallel relation to the longitudinal axis Y and the length of the vehicle 10), and the segment 138*ii* extends (vertically downward) from the segment 138*i* in (generally) orthogonal relation thereto such that the segments 138*i*, 138*ii* collectively define a (first) pocket 142. As seen in FIG. 6, the segment 138*ii* includes a detent 144 (or other such projection), which extends (vertically downward) from the segment 138*ii* in (generally) orthogonal relation thereto. In the particular embodiment illustrated, the detent 144 is formed integrally (e.g., unitarily, monolithically) with the segment 138*ii*. Embodiments are also envisioned, however, in which the segment 138*ii* and the detent 144 may be formed as separate, discrete structures that may be removably or fixedly (e.g., non-removably) connected together in any suitable manner, including, for example, via at least one mechanical fastener (e.g., one or more bolts, screws, rivets, pins, clips, etc.), via welding, or the like.

With specific reference to FIGS. 4-7, in certain embodiments, the airflow regulation assembly 100 also includes at least one mounting bracket 146 that (operatively, indirectly) connects the active grille shutter 102 to the reinforcement member 20. The mounting bracket(s) 146 are positioned (vertically) between the active grille shutter 102 and the reinforcement member 20 so as to physically separate the active grille shutter 102 and the reinforcement member 20 and correspond in number to the mounting members 118. As such, in the particular embodiment illustrated, the airflow regulation assembly 100 includes two mounting members 118. It should be appreciated, however, that the particular number of mounting brackets 146 may be altered in various embodiments without departing from the scope of the present disclosure (e.g., depending upon the style of the vehicle 10, the configuration of the active grille shutter 102, the configuration of the reinforcement member 20, spatial requirements, etc.). Embodiments of the airflow regulation assembly 100 including both greater and fewer numbers of mounting brackets 146 are thus contemplated herein and would not be beyond the scope of the present disclosure.

It is envisioned that the mounting brackets 146 may include (e.g., may be formed from) any suitable material or combination of materials. Although illustrated as including (e.g., as being formed partially or entirely from) a metallic material (e.g., aluminum, stainless steel, etc.) in the particular embodiment illustrated, it is envisioned that the mounting brackets 146 may include any suitable material or combination of materials, whether metallic or non-metallic. For example, embodiments are also envisioned in which the mounting brackets 146 may include (e.g., may be formed partially or entirely from) one or more plastic materials, one or more polymeric materials, one or more composite materials (e.g., carbon fiber), etc.

The mounting brackets 146 are configured for insertion into (reception by) the pockets 142 (FIG. 6) defined by the mounting members 118, which not only reduces spatial requirements (e.g., the overall (vertical) height of the active grille shutter 102), but increases the stability of the airflow regulation assembly 100. The mounting brackets 146 each include a generally Z-shaped (vertical) cross-sectional configuration that is defined by a (first) leg 148*i*, a (second) leg 148*ii*, and a (third) leg 148*iii*. While the legs 148*i*, 148*ii*, 148*iii* are shown as being integrally (e.g., unitarily, monolithically) formed in the particular embodiment illustrated, embodiments are also envisioned in which the legs 148*i*, 148*ii*, 148*iii* may be formed as separate, discrete structures that may be removably or fixedly (e.g., non-removably) connected together in any suitable manner, including, for example, via at least one mechanical fastener (e.g., one or more bolts, screws, rivets, pins, clips, etc.), via welding, or the like.

The leg 148*i* includes (defines) an aperture 150 and is configured for positioning between the active grille shutter 102 (e.g., the corresponding mounting member 118) and the reinforcement member 20 such that the leg 148*i* extends axially in (generally) parallel relation to the longitudinal axis Y, the length of the vehicle 10, and the segment 138*i* of the mounting member 118. The leg 148*ii* extends (vertically downward) from the leg 148*i* in (generally) orthogonal relation thereto such that the legs 148*i*, 148*ii* collectively define a (second) pocket 152. As described in further detail below, the pocket 152 is configured to receive (accommodate) the reinforcement member 20 such that the legs 148*i*,148*ii* are positioned in engagement (contact) therewith, as can be appreciated through reference to FIG. 6. The leg 148*iii* defines an opening 154 and extends axially from the leg 148*ii* in (generally) orthogonal relation thereto and in (generally) parallel relation to the longitudinal axis Y, the length of the vehicle 10, the leg 148*i*, and the segment 138*i* of the mounting member 118.

In certain embodiments of the disclosure, it is envisioned that the mounting brackets 146 may include at least one alignment member 156 (FIGS. 5, 6) (e.g., one or more alignment pins 158) that is configured for insertion into (reception by) at least one corresponding receptacle 28 (FIG. 6) (e.g., one or more slits, channels, apertures, or other such openings) in the reinforcement member 20. Engagement of the alignment member(s) 156 and the reinforcement member 20 facilitates proper relative orientation (registration, alignment) of the active grille shutter 102 (e.g., the mounting members 118), the mounting brackets 146, and the reinforcement member 20 and, thus, proper assembly and installation of the airflow regulation assembly 100. Although shown as extending (vertically downward) from the leg 148*i* in (generally) orthogonal relation thereto, and in (generally) parallel relation to the leg 148*ii*, in the specific embodiment illustrated, it is envisioned that the particular number, location, and/or orientation of the alignment member(s) 156 may be varied in alternate embodiments without departing from the scope of the present disclosure. For example, embodiments are envisioned in which the legs 148*i* may include a plurality of alignment members 156, as are embodiments in which at least one alignment member 156 may be provided on the leg 148*ii*.

Upon assembly of the airflow regulation assembly 100, the mounting brackets 146 are connected to the mounting members 118 via at least one mechanical fastener 160, which correspond in number to the mounting members 118 and the mounting brackets 146. As such, in the particular embodiment illustrated, the airflow regulation assembly 100 includes two mechanical fasteners 160. It should be appreciated, however, that the particular number of mechanical fasteners 160 may be altered in various embodiments without departing from the scope of the present disclosure (e.g., depending upon the style of the vehicle 10, the configuration of the active grille shutter 102, the configuration of the reinforcement member 20, spatial requirements, etc.). As such, embodiments of the airflow regulation assembly 100 including both greater and fewer numbers of mechanical fasteners 160 are contemplated herein and would not be beyond the scope of the present disclosure.

The mechanical fasteners 160 extend through the active grille shutter 102 via the aperture(s) 140 in the segments 138$i$ of the mounting members 118, into and through the mounting brackets 146 via the aperture(s) 150 in the legs 148$i$, and into aperture(s) 30 in the reinforcement member 20. The mounting brackets 146 thus facilitate direct (mechanical) connection of the airflow regulation assembly 100 to the reinforcement member 20, whereby the airflow regulation assembly 100 is integrated into the reinforcement member 20, and operative (indirect) connection of the active grille shutter 102 to the reinforcement member 20.

In the particular embodiment illustrated, each mechanical fastener 160 includes a bolt 162 and a nut 164 that is configured for removable (e.g., threaded) connection to the bolt 162. It should be appreciated, however, that the particular configuration of the mechanical fasteners 160 may be varied in alternate embodiments without departing from the scope of the present disclosure. For example, it is envisioned that the mechanical fasteners 160 may instead include screws, rivets, pins, clips, or the like.

Figure 8:
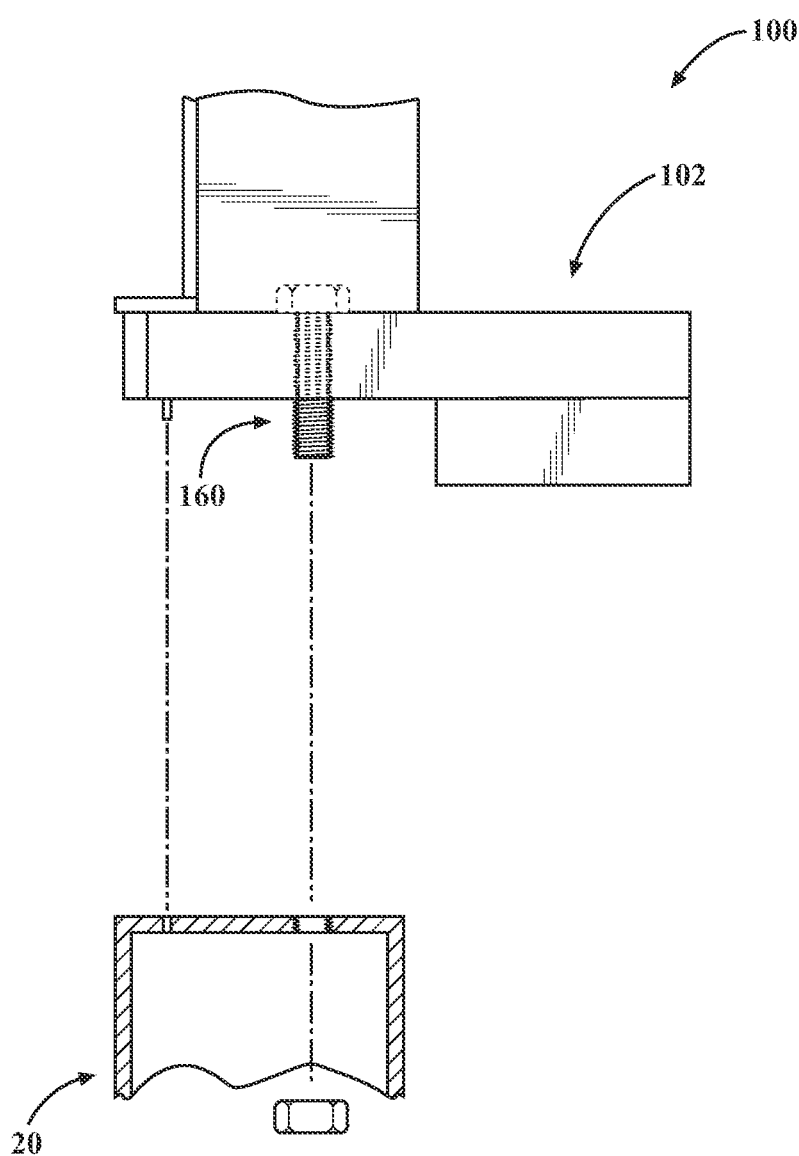
FIG. 8 is a partial, side, plan view of an alternate embodiment of the airflow regulation assembly shown during connection to the reinforcement member.

Depending upon spatial requirements, cost constraints, manufacturing limitations, etc., embodiments of the airflow regulation assembly 100 are also envisioned in which the mounting brackets 146 may be eliminated, as seen in FIG. 8. In such embodiments, the active grille shutter 102 may be configured for direct connection to the reinforcement member 20 (e.g., via the mechanical fasteners 160).

Additionally, while the active grille shutter 102 and the reinforcement member 20 are illustrated as separate, discrete components of the vehicle 10 in the particular embodiment of the disclosure illustrated in FIGS. 1-7, embodiments are also envisioned in which the active grille shutter 102 and the reinforcement member 20 may be integrally (e.g., unitarily, monolithically) formed, thereby obviating the need for the mounting brackets 146, the mechanical fastener(s) 160, or any other such mechanical connection therebetween.

With reference again to FIGS. 4-7, in certain embodiments of the disclosure, such as that illustrated, it is envisioned that the airflow regulation assembly 100 may include at least one dampener 166 that is positioned between the active grille shutter 102 (e.g., the mounting members 118) and the mounting bracket 146 (e.g., such that the dampener(s) 166 are positioned (vertically) above mounting brackets 146). The dampener(s) 166 are configured to absorb forces and thereby reduce rattle, improve stability of the airflow regulation assembly 100, etc., and correspond in number to the mounting members 118 and the mounting brackets 146. As such, in the particular embodiment illustrated, the airflow regulation assembly 100 includes two dampeners 166. It should be appreciated, however, that the particular number of dampeners 166 may be altered in various embodiments without departing from the scope of the present disclosure (e.g., depending upon the style of the vehicle 10, the configuration of the active grille shutter 102, the configuration of the reinforcement member 20, spatial requirements, etc.). As such, embodiments of the airflow regulation assembly 100 including both greater and fewer numbers of dampeners 166 are contemplated herein and would not be beyond the scope of the present disclosure.

The dampeners 166 may include (e.g., may be formed from) any material or combination of materials suitable for the intended purpose of absorbing forces in the manner described herein. For example, in the particular embodiment illustrated, the dampeners 166 include (e.g., are formed partially or entirely from) a shock-absorbent foam (e.g., an expanded polypropylene foam). Embodiments in which the dampeners 166 may include a polymeric construction (e.g., embodiments in which the dampeners 166 may include one or more rubberized materials), however, are also envisioned herein and would not be beyond the scope of the present disclosure.

As seen in FIG. 6, each dampener 166 includes an aperture 168 and a cavity 170. The aperture 168 is configured to receive the mechanical fasteners 160 (e.g., the bolts 162) such that the mechanical fasteners 160 extend through the dampener 166 and into the aperture 150 in the leg 148$i$ of the corresponding mounting bracket 146. The cavity 170 is configured to receive the leg 148$i$ of the corresponding mounting bracket 146 such that the mounting brackets 146 are positioned within (received by) the dampeners 166, which further reduces spatial requirements (e.g., the overall (vertical) height of the active grille shutter 102) and further increases the stability of the airflow regulation assembly 100.

Figure 5:
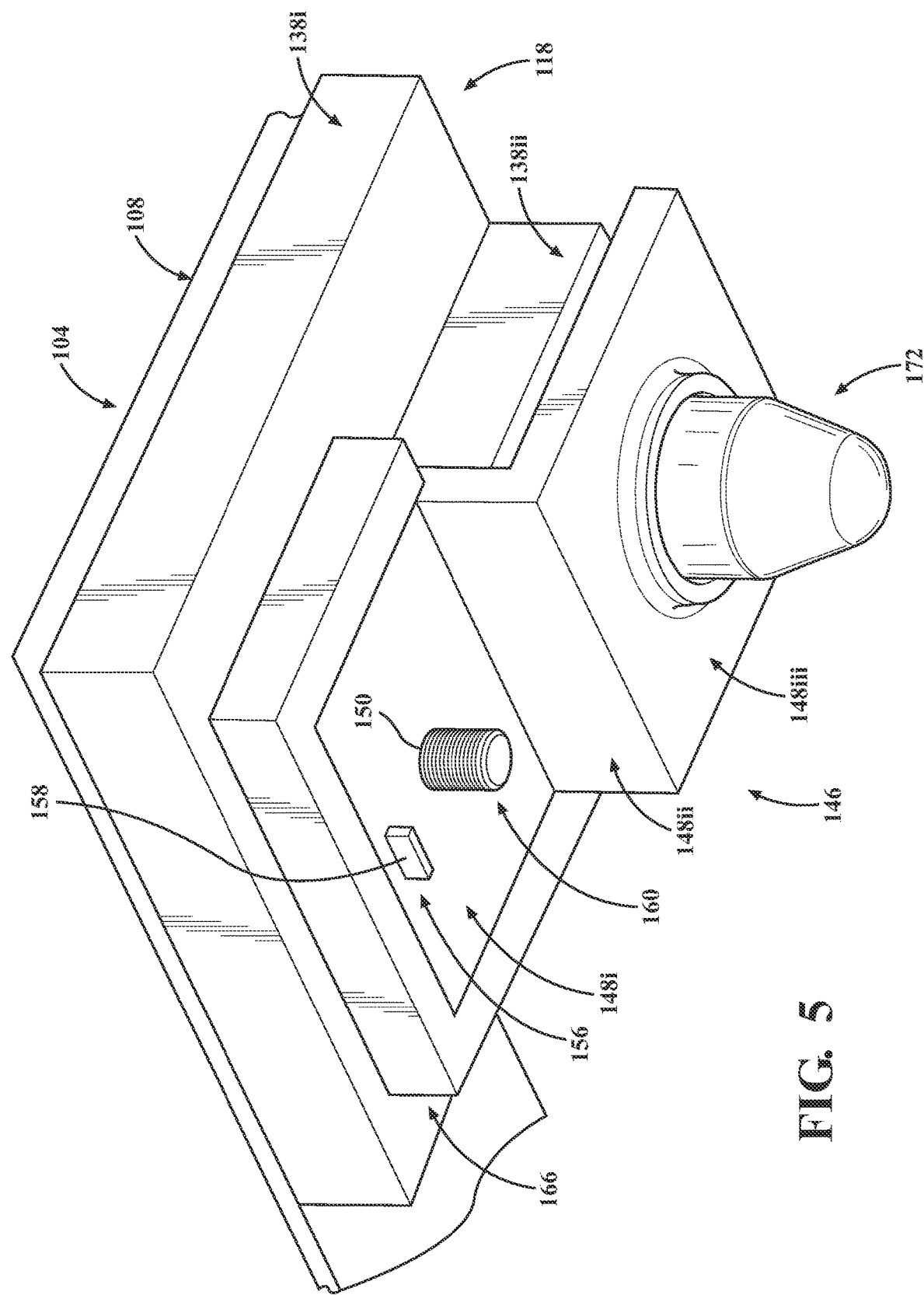
FIG. 5 is an enlargement of the area of detail identified in FIG. 4.

With particular reference now to FIGS. 5 and 6, in certain embodiments of the disclosure, it is envisioned that the airflow regulation assembly 100 may further include at least one grommet 172, which corresponds in number to the mounting members 118 and the mounting brackets 146. As such, in the particular embodiment illustrated, the airflow regulation assembly 100 includes two grommets 172. It should be appreciated, however, that the particular number of grommets 172 may be altered in various embodiments without departing from the scope of the present disclosure (e.g., depending upon the style of the vehicle 10, the configuration of the active grille shutter 102, the configuration of the reinforcement member 20, spatial requirements, etc.). As such, embodiments of the airflow regulation assembly 100 including both greater and fewer numbers of grommets 172 are contemplated herein and would not be beyond the scope of the present disclosure.

The grommets 172 are configured to not only inhibit relative movement between the active grille shutter 102 (e.g., the mounting members 118) and the mounting brackets 146, thereby stabilizing the active grille shutter 102, but facilitate proper alignment of the active grille shutter 102 (e.g., the mounting members 118) and the mounting brackets 146, and may include (e.g., may be formed from) any material or combination of materials suitable for these intended purposes. For example, in the particular embodiment illustrated, the grommets 172 include (e.g., are formed partially or entirely from) one or more polymeric (e.g., rubberized) materials, which also improves dampening and force absorption in the airflow regulation assembly 100. Embodiments in which the grommets 172 may include one or more alternate materials of construction are also envisioned herein, however, and would not be beyond the scope of the present disclosure.

The grommets 172 extend between the active grille shutter 102 (e.g., the mounting members 118) and the mounting brackets 146 and are positioned axially inward of (e.g., are spaced rearwardly from) the reinforcement member 20 along the longitudinal axis Y and the length of the vehicle 10. The grommets 172 are connected to (supported by, engaged with) the mounting members 118 and, more specifically, define internal channels 174 (FIG. 6) that are configured to receive the detents 144 extending from the segments 138ii of the mounting members 118.

In the particular embodiment illustrated, the grommets 172 are configured to receive the detents 144 so as to form an interference (press) fit therebetween. It is envisioned, however, that the grommets 172 and the detents 144 may be connected (secured) together in any suitable manner, including, for example, via at least one mechanical fasteners (e.g., one or more bolts, screws, rivets, pins, clips, etc.), via an adhesive, etc.

As seen in FIG. 6, the grommets 172 include bodies 176 having tapered ends 178 and heads 180 that extend radially (laterally) outward from the bodies 176. The grommets 172 extend into (e.g., through) the mounting brackets 146 and, more specifically, are configured such that the bodies 176 are insertable into (receivable by) the openings 154 in the legs 148iii of the mounting brackets 146, which is facilitated by the tapered ends 178.

In the particular embodiment illustrated, the grommets 172 are configured for insertion into the openings 154 so as to form an interference (press) fit therebetween. It is envisioned, however, that the grommets 172 and the mounting brackets 146 may be configured for engagement (connection) in any suitable manner, including, for example, via at least one mechanical fastener (e.g., one or more bolts, screws, rivets, pins, clips, etc.), via an adhesive, etc. In certain embodiments, it is also envisioned that the grommets 172 may be configured to mechanically (and operatively, indirectly) connect the active grille shutter 102 (e.g., the mounting members 118) to the mounting brackets 146 (e.g., via one or more bolts, screws, rivets, pins, clips, or other such mechanical fasteners).

Upon insertion of the grommets 172 into the openings 154, the heads 180 engage (contact) outer (upper) surfaces 182 of the mounting brackets 146 (e.g., the legs 148iii), which inhibits (if not entirely prevents) over-advancement of the grommets 172 through the mounting brackets 146. More specifically, the heads 180 each define an outer transverse (horizontal) cross-sectional dimension (e.g., a diameter) Dh that exceeds an inner transverse (horizontal) cross-sectional dimension (e.g., a diameter) Do defined by the openings 154.

With reference now to FIGS. 1-7, a method of assembling and installing the airflow regulation assembly 100 will be discussed. During assembly and installation, the dampeners 166 are positioned within the pockets 142 (FIG. 6) defined by the segments 138i, 138ii of the mounting members 118, whereby the dampeners 166 nest within the mounting members 118 and the mechanical fasteners 160 (e.g., the bolts 162) extend through the apertures 168. Additionally, the grommets 172 are connected to the mounting members 118 via insertion of the detents 144 into the internal channels 174, and the mounting brackets 146 are positioned within the cavity 170 in the dampeners 166. Upon nesting of the mounting brackets 146 within the dampeners 166, the mechanical fasteners 160 extend into and through the apertures 150 in the legs 148i, and the grommets 172 extend into and through the openings 154 in the legs 148iii. Insertion of the grommets 172 into the and through the openings 154 facilitates proper alignment of the active grille shutter 102 (e.g., the mounting members 118) and the mounting brackets 146 and inhibits relative movement therebetween, thereby stabilizing the active grille shutter 102.

Prior to completing assembly and installation of the airflow regulation assembly 100, the mounting brackets 146 are positioned adjacent to the upper vertical end 24 of the reinforcement member 20 such that the reinforcement member 20 supports the active grille shutter 102 in the elevated position seen in FIG. 1. More specifically, the mounting brackets 146 are positioned such that the reinforcement member 20 is located within the pockets 152 defined by the legs 148i, 148ii of the mounting brackets 146. The reinforcement member 20 thus nests within the mounting brackets 146, which further reduces spatial requirements (e.g., the overall (vertical) height of the active grille shutter 102) and further increases the stability of the airflow regulation assembly 100. During nesting of the reinforcement member 20 within the pockets 152, the alignment member(s) 156 are inserted into the receptacles 28 in the reinforcement member 20 and the mechanical fasteners 160 extend into and through the apertures 30. The mechanical fasteners 160 can then be secured within the active grille shutter 102 (e.g., the mounting members 118), the dampeners 166, the mounting brackets 146, and the reinforcement member 20 via connection of the nuts 164 to the bolts 162.

Either prior or subsequent to connection of the active grille shutter 102 and the reinforcement member 20, if necessary or desired, the active grille shutter 102 can be connected to the support structure 18 to increase stability of the active grille shutter 102 and inhibit (if not entirely prevent) relative movement between the active grille shutter 102 and the support structure 18. More specifically, as seen in FIG. 1, the braces 116 can be connected to the support structure 18 via insertion of the mechanical fastener(s) 134 through apertures 136 in the arms 132ii.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
  a vehicle body;
  a support structure connected to the vehicle body and configured to provide a framework for one or more thermal components of the vehicle;
  a reinforcement member connected to the vehicle body and configured to absorb impact forces;
  an active grille shutter aligned with the reinforcement member along a vertical reference axis, wherein the active grille shutter is directly connected to the reinforcement member such that the reinforcement member directly supports the active grille shutter, the active grille shutter including:
    a main body;
    at least one shutter movably connected to the main body; and
    an actuator connected to the at least one shutter such that the at least one shutter is repositionable between open and closed positions to thereby vary airflow into the vehicle;
  a mounting bracket positioned vertically between the active grille shutter and the reinforcement member such that the mounting bracket physically separates the active grille shutter and the reinforcement member; and
  at least one fastener extending into the reinforcement member through the active grille shutter and the mounting bracket to thereby mechanically connect the active grille shutter to the reinforcement member via the mounting bracket.

2. The vehicle of claim 1, wherein the main body includes:
  a frame configured to support the at least one shutter and the actuator; and
  braces extending laterally outward from the frame and configured for connection to the support structure.

3. The vehicle of claim 2, wherein the frame defines a chamber configured to receive the actuator.

4. The vehicle of claim 2, wherein the braces each include:
  a first arm extending in generally parallel relation to the frame; and
  a second arm extending in transverse relation to the first arm.

5. The vehicle of claim 1, wherein the mounting bracket includes a generally Z-shaped cross-sectional configuration.

6. The vehicle of claim 1, wherein the mounting bracket includes:
  a first leg positioned vertically between the active grille shutter and the reinforcement member;
  a second leg extending from the first leg in generally orthogonal relation thereto, wherein the first leg and the second leg are configured for engagement with the reinforcement member; and
  a third leg extending from the second leg in generally orthogonal relation thereto.

7. The vehicle of claim 6, wherein the first leg and the third leg extend in generally parallel relation.

8. The vehicle of claim 6, wherein the first leg includes an alignment member configured for engagement with the reinforcement member to facilitate proper relative orientation of the active grille shutter, the mounting bracket, and the reinforcement member.

9. The vehicle of claim 6, further comprising a grommet positioned between the active grille shutter and the mounting bracket to inhibit relative movement therebetween.

10. The vehicle of claim 9, wherein the grommet extends through the third leg of the mounting bracket such that the grommet is spaced axially from the reinforcement member along a length of the vehicle.

11. A vehicle comprising:
  a vehicle body;
  a support structure connected to the vehicle body and configured to provide a framework for one or more thermal components of the vehicle;
  a reinforcement member connected to the vehicle body and configured to absorb impact forces, wherein the support structure is positioned axially inward of the reinforcement member along a length of the vehicle;
  an airflow regulation assembly including an active grille shutter aligned with the reinforcement member along a vertical reference axis, wherein the active grille shutter is directly connected to the reinforcement member; and
  a mounting bracket positioned vertically between the active grille shutter and the reinforcement member such that the reinforcement member directly supports the active grille shutter in an elevated position vertically above the reinforcement member and such that the mounting bracket physically separates the active grille shutter and the reinforcement member.

12. The vehicle of claim 11, wherein the active grille shutter is mechanically connected to an upper vertical end of the reinforcement member.

13. The vehicle of claim 11, wherein the active grille shutter is indirectly connected to the reinforcement member.

14. The vehicle of claim 11, wherein the airflow regulation assembly further includes a dampener positioned between the active grille shutter and the mounting bracket.

15. A vehicle comprising:
a vehicle body;
a support structure connected to the vehicle body and configured to provide a framework for one or more thermal components of the vehicle;
a reinforcement member connected to the vehicle body and configured to absorb impact forces; and
an airflow regulation assembly aligned with the reinforcement member along a vertical reference axis, wherein the airflow regulation assembly is directly connected to the reinforcement member, the airflow regulation assembly including:
an active grille shutter including:
a main body including a frame and having an upper end and a lower end;
a mounting member extending from the lower end; and
a mounting bracket connected to the mounting member such that the mounting bracket is positioned vertically between the mounting member and the reinforcement member, wherein the main body and the mounting bracket are configured as discrete components of the active grille shutter such that mounting bracket physically separates the main body from the reinforcement member.

16. The vehicle of claim 15, wherein the mounting member includes a generally L-shaped cross-sectional configuration.

17. The vehicle of claim 16, wherein the mounting bracket includes a generally Z-shaped cross-sectional configuration.

18. The vehicle of claim 17, wherein the mounting member includes:
a first segment extending axially from the lower end of the active grille shutter along a length of the vehicle; and
a second segment extending from the first segment in generally orthogonal relation thereto.

19. The vehicle of claim 18, wherein the mounting bracket includes:
a first leg extending in generally parallel relation to the first segment;
a second leg extending from the first leg in generally orthogonal relation thereto; and
a third leg extending from the second leg in generally orthogonal relation thereto and in generally parallel relation to the second segment.

20. The vehicle of claim 14, wherein the dampener is positioned vertically between the active grille shutter and the reinforcement member.

* * * * *